(12) United States Patent
Muylaert, Jr. et al.

(10) Patent No.: US 8,632,307 B1
(45) Date of Patent: Jan. 21, 2014

(54) ULTRA-LIGHT WEIGHT SELF-LUBRICATING PROPELLER HUB

(75) Inventors: Neal W. Muylaert, Jr., Apache JCT, AZ (US); Lyndon C. Lamborn, Mesa, AZ (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/588,796

(22) Filed: Aug. 17, 2012

Related U.S. Application Data

(63) Continuation of application No. 12/472,201, filed on May 26, 2009, now Pat. No. 8,262,358.

(51) Int. Cl.
*B64C 11/02* (2006.01)
*B64C 11/04* (2006.01)

(52) U.S. Cl.
USPC .................................. 416/134 A; 416/244 A (58) Field of Classification Search
USPC ....... 416/134 A, 168 R, 244 A, 244 R, 245 R
See application file for complete search history.

(56) References Cited

U.S. PATENT DOCUMENTS

| | | | | |
|---|---|---|---|---|
| 1,908,893 A | * | 5/1933 | Edman | 416/166 |
| 2,612,959 A | * | 10/1952 | Blanchard et al. | 416/45 |
| 3,664,764 A | * | 5/1972 | Davies et al. | 416/224 |
| 3,923,422 A | * | 12/1975 | Ianniello et al. | 416/226 |
| 4,275,993 A | * | 6/1981 | Sprengling | 416/207 |
| 4,281,966 A | * | 8/1981 | Duret et al. | 416/134 A |
| 4,302,155 A | * | 11/1981 | Grimes et al. | 416/144 |
| 4,524,499 A | * | 6/1985 | Grimes et al. | 29/889.61 |
| 4,591,313 A | | 5/1986 | Miyatake et al. | |
| 4,626,173 A | * | 12/1986 | Mouille et al. | 416/134 A |
| 4,850,801 A | * | 7/1989 | Valentine | 416/205 |
| 4,904,157 A | * | 2/1990 | Pace et al. | 416/46 |
| 4,921,403 A | * | 5/1990 | Poucher et al. | 416/147 |
| 4,957,415 A | * | 9/1990 | Paul et al. | 416/245 R |
| 5,102,301 A | | 4/1992 | Morrison | |
| 5,104,291 A | | 4/1992 | Morrison | |
| 5,118,256 A | * | 6/1992 | Violette et al. | 416/134 R |
| 5,284,420 A | * | 2/1994 | Guimbal | 416/134 A |
| 5,415,527 A | * | 5/1995 | Godwin | 416/205 |
| 6,015,264 A | * | 1/2000 | Violette et al. | 416/146 A |
| 6,383,042 B1 | | 5/2002 | Neisen | |
| 6,443,701 B1 | | 9/2002 | Muhlbauer | |
| 6,609,892 B1 | | 8/2003 | Kreul et al. | |
| 6,835,349 B2 | | 12/2004 | Pyzik et al. | |

(Continued)

FOREIGN PATENT DOCUMENTS

GB          942370          11/1963

OTHER PUBLICATIONS

United States Patent and Trademark Office, "Notice of Allowance," issued in connection with U.S. Appl. No. 12/472,201, issued Feb. 17, 2012, 14 pages.

(Continued)

*Primary Examiner* — Nathaniel Wiehe
*Assistant Examiner* — Sean J Younger
(74) *Attorney, Agent, or Firm* — Hanley, Flight & Zimmerman, LLC (57) ABSTRACT

A propeller assembly includes a rotatable hub having a center metal hub portion and an outer composite hub portion. A set of composite propeller blades are mounted for pitch control rotation on the hub by a set of dry bearings.

24 Claims, 6 Drawing Sheets

(56) References Cited

U.S. PATENT DOCUMENTS

| | | | |
|---|---|---|---|
| 7,422,419 B2* | 9/2008 | Carvalho | 416/205 |
| 8,262,358 B1 | 9/2012 | Muylaert et al. | |
| 2004/0118969 A1 | 6/2004 | MacCready et al. | |
| 2008/0279689 A1 | 11/2008 | Sebald | |
| 2009/0092493 A1 | 4/2009 | Violette | |

OTHER PUBLICATIONS

United States Patent and Trademark Office, "Non-Final Office Action," issued in connection with U.S. Appl. No. 12/472,201, issued Sep. 22, 2011, 34 pages.

Airworthiness Directive, "Eurocopter BO 105 Series Helicopters Tension-Torsion Strap," Commonwealth of Australia, Civil Aviation Safety Authority, Schedule of Airworthiness Directives, Civil Aviation Safety Regulations, 1998, Part 39-105, 2 pages.

Civil Aviation Authority Czech Republic, "Survey LBA and FAA AD Issued to Apr. 4, 2004 for Eurocopter BO 105 Helicopter," Airtworthiness Directive, No. CAA-AS-038/2004, Apr. 21, 2004, 3 pages.

Taylor et al., "Design and Construction of the Variable-Pitch Air Turbine for the Azores Wave Energy Plant," University of Edinburgh, Scotland, retrieved from www.mech.ed.ac.uk/research/wavepower/turbine/index.htm on Mar. 10, 2009, 11 pages.

"Helicopter Rotorhead Gallery," Index, retrieved from www.b-domke.de/AviationImages/Rotorhead.html on Mar. 10, 2009, copyright 2000-2009 by Burkhard Domke, 19 pages.

"Rotor System Operation," FM 1-514, Chapter 3, retrieved from www.cavalrypilotcorn/fml-514/CH3.htm on Mar. 10, 2009, 27 pages.

Taylor, Michael, "Brassey's World Aircraft & Systems Directory 1999/2000," XP002477329, 1999, p. 220, 1 page.

Atreya et al., Power System Comparisons for a High Altitude Long Endurance (HALE) Remotely Operated Aircraft (ROA), AIAA 5th Aviation, Technology, Integration, and Operations Conference, AIAA 2005-7401, Oct. 2005, 13 pages.

* cited by examiner

FIG. 13

ULTRA-LIGHT WEIGHT SELF-LUBRICATING PROPELLER HUB

CROSS REFERENCE TO RELATED APPLICATION

This patent arises from a continuation of U.S. patent application Ser. No. 12/472,201, filed May 26, 2009, entitled "Ultra-Light Weight Self-Lubricating Propeller Hub," which is hereby incorporated herein by reference in its entirety.

TECHNICAL FIELD

This disclosure generally relates to aircraft, and deals more particularly with an ultra-light weight, self-lubricating propeller hub, especially for airplanes.

BACKGROUND

Airplane propellers often use a hub for mounting a plurality of propeller blades on a drive shaft driven by an engine. Some propeller hubs have provision for pitch control to allow adjustment of blade pitch as the propeller rotates. Airplane propellers spinning at high rates with pitch adjustment subject hub components to a variety of relatively significant loads, including centrifugal force produced by the blades. To react these loads, prior hubs utilized relatively heavy components and closely coupled, roller bearings that use wet lubricants and a separate aerodynamic fairing to direct the airflow around the hub.

A variety of new airplane designs require reductions in the size and weight of components, including propeller hubs. For example ultra-light weight, high altitude, long range airplanes may require lighter weight components, including propeller hubs, in order to meet performance specifications. Existing designs for propeller hubs employ components that may be too large and/or too heavy for use in these applications. In addition, the exceptionally cold temperatures encountered at high altitudes increase the viscosity of wet bearing lubrication, which in turn reduces the efficiency of the propeller.

Accordingly, there is a need for a compact propeller hub that employs light-weight components, and which reduces or eliminates the need for wet lubricated bearings.

SUMMARY

The disclosed embodiments provide a propeller having a hub that employs a hybrid of metal and composites in order to maximize structural efficiency within an allotted space envelope. A composite portion of the hub includes an outer composite conical section that serves both as an aerodynamic fairing and as a means for structurally supporting the propeller blades. Dry bearings are used to mount the blades on the hub for pitch rotation. Bearing couple is maximized within the allotted envelope, thereby reducing the moment reacting forces on the pitch change bearings. The distance between the pitch change bearings is maximized, thereby minimizing the moment reaction loads on the bearings which in turn may increase bearing life. Light weight flexible straps connect the blades to the hub and the blades are used to react centrifugal force generated by rotation of the propeller, while allowing rotation for pitch adjustment.

According to one disclosed embodiment, a propeller includes a rotatable hub having a center hub portion and an outer hub portion. A set of propeller blades are rotatably mounted on the center and outer hub portions for blade pitch adjustment using dry bearings. The outer hub portion is substantially entirely formed of composite materials and surrounds the center hub portion.

According to another embodiment, an airplane propeller assembly includes a propeller having a plurality of propeller blades. A rotatable hub includes a center hub portion and an outer composite hub portion surrounding and mounted on the center hub portion. Means are provided for mounting a first section of each of the blades on the center hub portion and for mounting a second section of each of the blades on the outer hub portion. The mounting means may include first and second sets of dry bearings. Each of the propeller blades includes a composite blade body and a fitting that is connected to the center hub portion by a flexible strap in order to react centrifugal force applied to the blade by rotation of the propeller.

According to still another embodiment, an airplane propeller having blade pitch control comprises a propeller having a plurality of propeller blades. A rotatable hub includes an exposed outer section forming a fairing. Means are provided for rotatably mounting each of the blades on the exposed outer section for pitch adjustment. The mounting means include a composite bearing having a low friction coating.

The features, functions, and advantages that have been discussed can be achieved independently in various embodiments of the present disclosure or may be combined in yet other embodiments further details of which can be seen with reference to the following description and drawings.

BRIEF DESCRIPTION OF THE ILLUSTRATIONS

DETAILED DESCRIPTION

Figure 1:
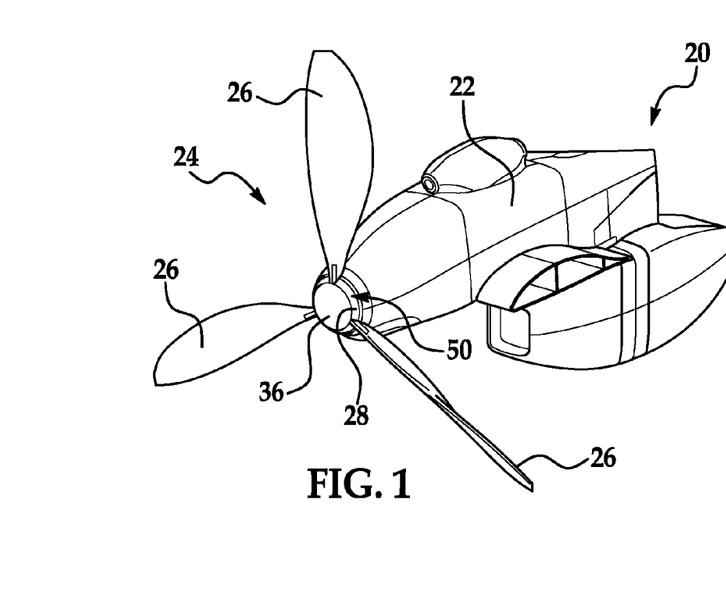
FIG. 1 is a perspective illustration of an airplane engine including a propeller assembly according to the disclosed embodiments, portions of the blades being cut away to reveal blade root fittings.
Figure 2:
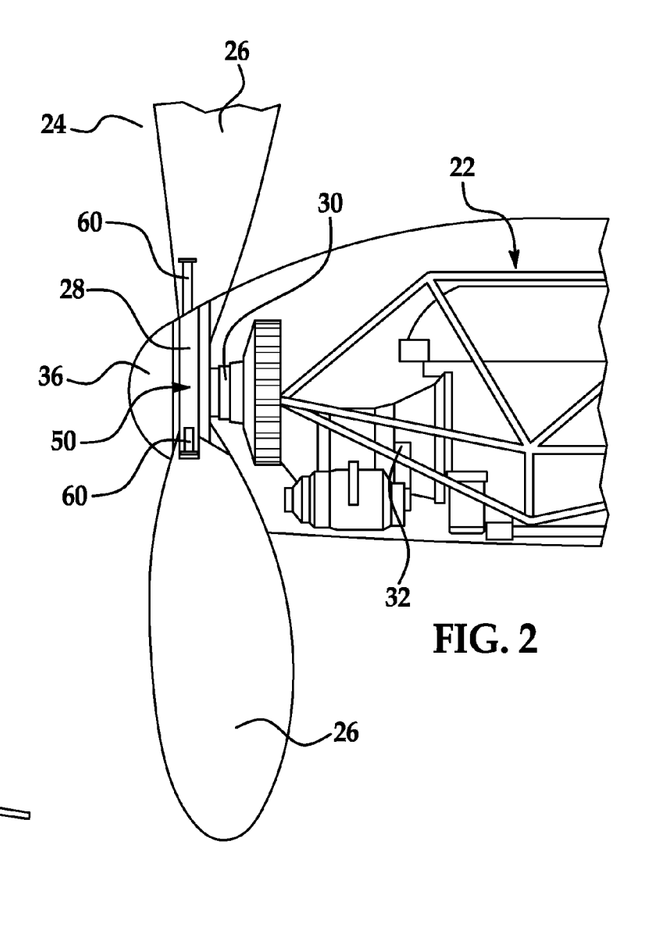
FIG. 2 is a side view illustration of a forward portion of the engine and propeller assembly shown in FIG. 1.
Figure 3:
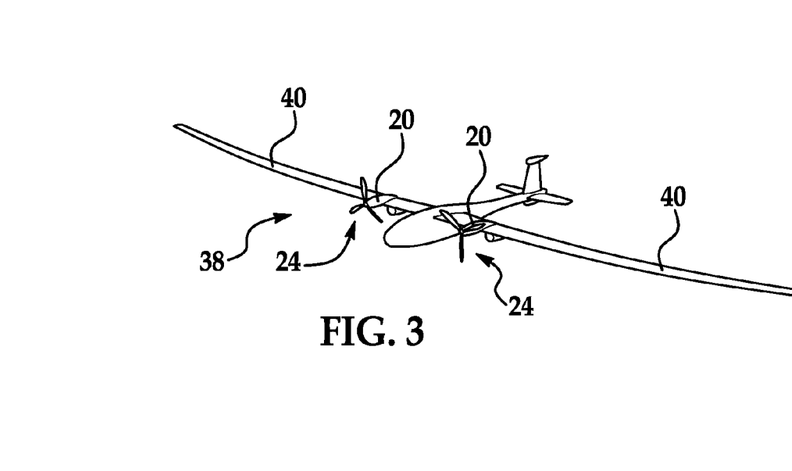
FIG. 3 is a perspective illustration of a typical airplane utilizing the engine and propeller assembly shown in FIGS. 1 and 2.

Referring first to FIGS. 1-3, one or more engines 20 may be used to power an airplane 38, which in the illustrated example, is an ultra-light weight airplane having extended wings 40 suitable for long range, high altitude applications.

However, the disclosed embodiments may be used in connection with a wide range of other aircraft.

The engine 20 rotates a propeller 24 which, in the illustrated example, includes three variable pitch propeller blades 26. The blades 26 are mounted on a propeller hub 28 which is connected to a rotational drive interface 30 forming part of a gearbox 32 driven by a motor 22. The blades 26 are mounted for rotation on the hub by blade root fittings 60 (FIG. 2) and later discussed tension straps (not shown). The hub 28 includes an exposed tapered structural section 50 that forms an aerodynamic transition or fairing between a nosepiece or "spinner" 36 and an engine nacelle 22.

Figure 4:
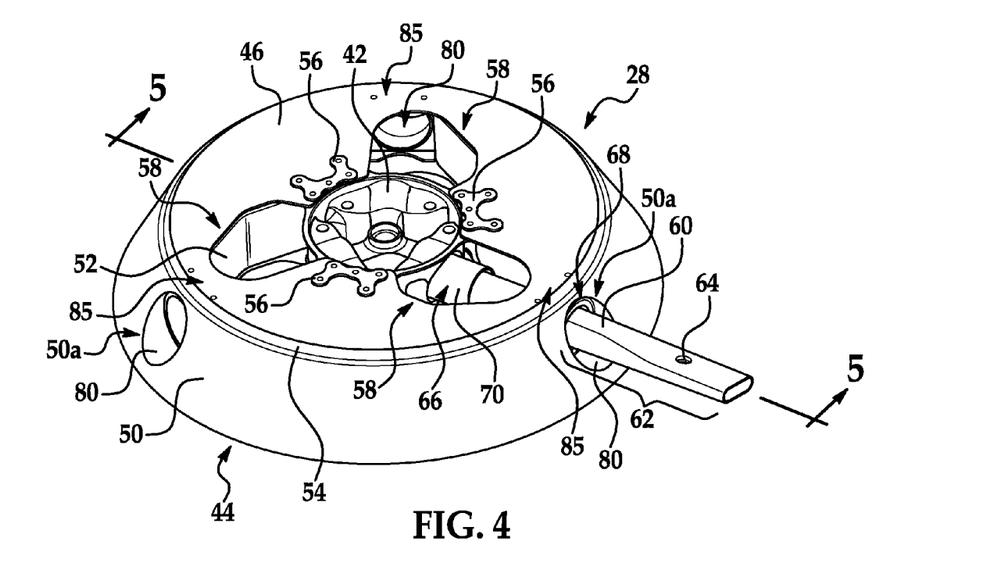
FIG. 4 is an isometric illustration of the forward part of the hub including a single blade fitting, the remainder of the blades having been removed for clarity.
Figure 5:
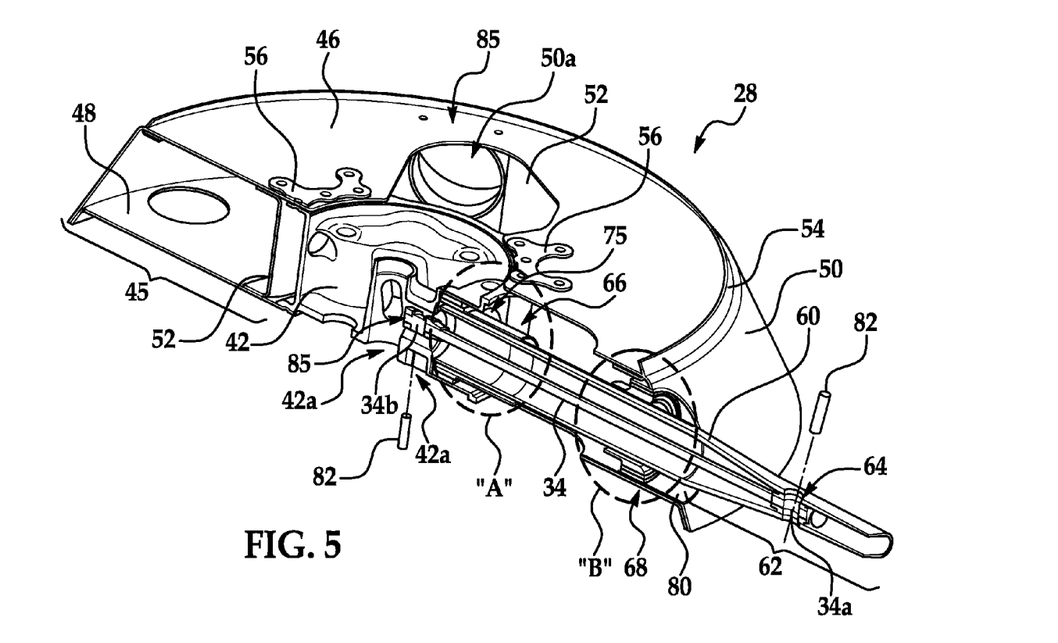
FIG. 5 is a sectional illustration taken along the line 5-5 in FIG. 4.
Figure 6:
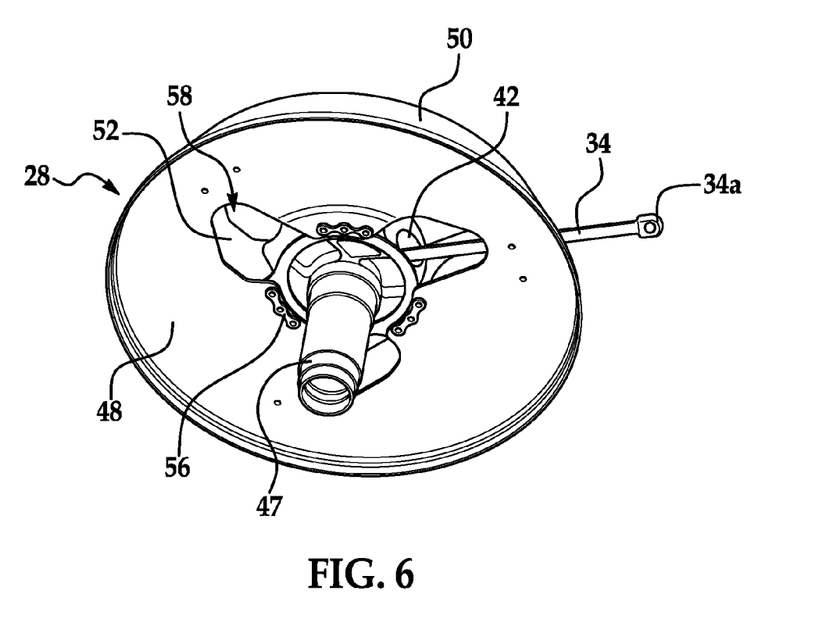
FIG. 6 is an isometric illustration of the aft end of the hub.

Attention is now directed to FIGS. 4-13 which illustrate additional details of the propeller hub 28. As best seen in FIG. 5, the hub 28 broadly includes a center hub portion 42 and a drum-like composite outer hub portion 45 which surrounds and is mounted on the inner hub portion 42. The outer hub portion 45 is generally hollow and broadly includes fore and aft, spaced apart composite hub plates 46, 48 respectively, connected together at their outer peripheries by the tapered composite structural section 50. The hub plates 46, 48 may each include cut away areas or openings therein 58 to reduce the weight of the hub 28. The inboard perimeter of the hub plates 46, 48 are connected to each other by three, boomerang-shaped composite stiffener ribs 52 (see FIGS. 5 and 7) which are generally C-shaped in cross section and function to bridge and stabilize the hub plates 46, 48. The hub plates 46, 48, structural fairing section 50 and ribs 52 may be joined together by co-bonding although the use of some fasteners may be desirable or necessary. Hub plate 46 may include an outer circumpherencial lip 54 (FIGS. 4 and 10) used to assist in centering and mounting the spinner 36 (FIGS. 1 and 2) on the hub 28.

Figure 7:
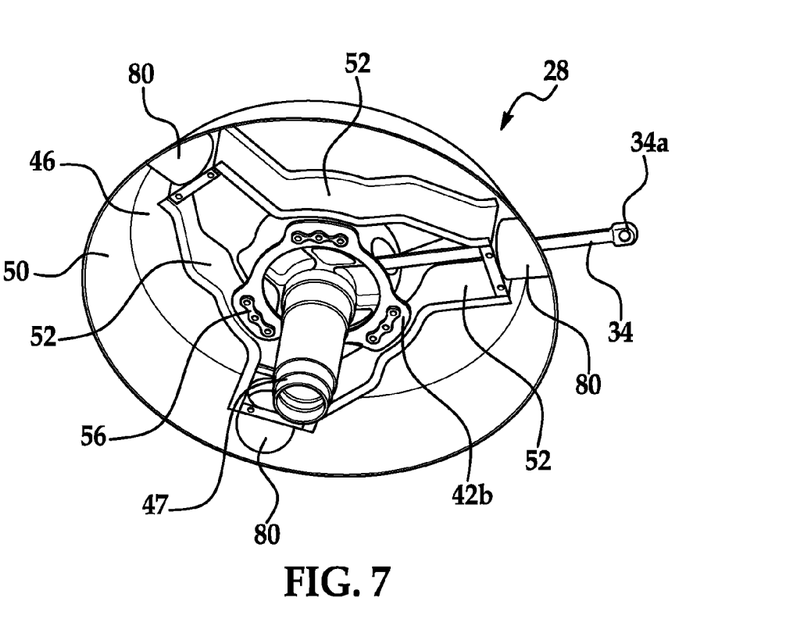
FIG. 7 is an illustration similar to FIG. 6 with the aft hub plate having been removed to illustrate additional details of the hub.
Figure 8:
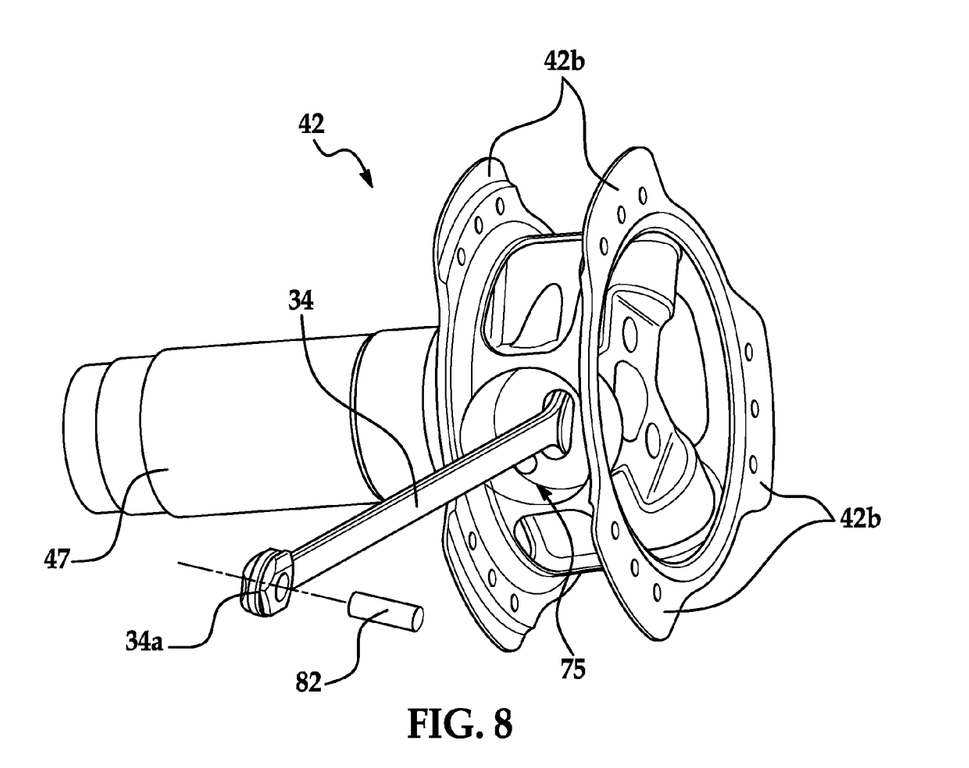
FIG. 8 is an isometric illustration of the center hub portion and a blade tension strap.
Figure 9:
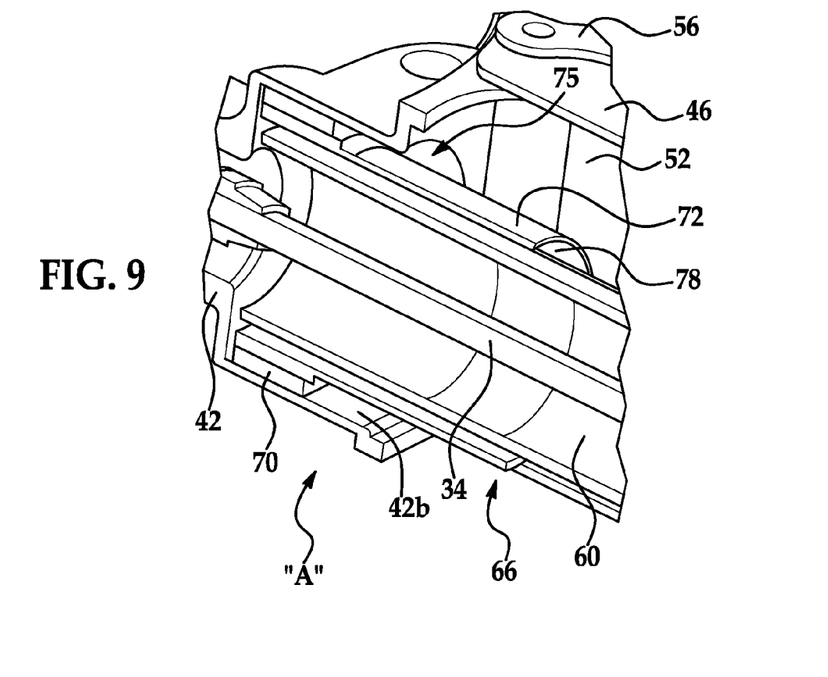
FIG. 9 is a perspective illustration of the area designated as "A" in FIG. 5.
Figure 10:
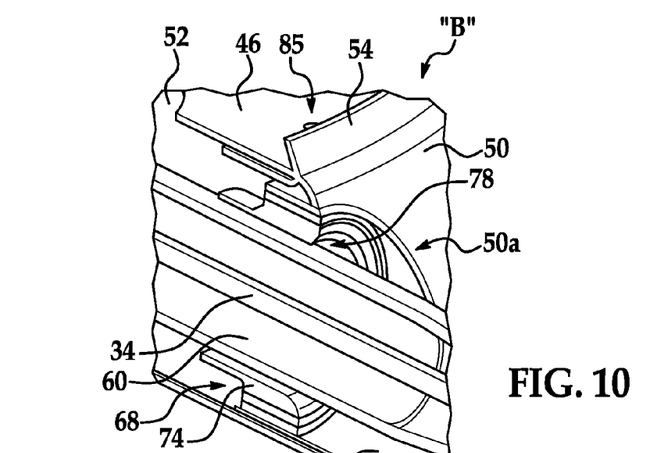
FIG. 10 is a perspective illustration of the area designated as "B" in FIG. 5.

The center hub portion 42 may be formed of any suitable metal such as alloys of aluminum, titanium or others, and may be cast or machined as a single piece. As best seen in FIGS. 7 and 8, the center hub portion 42 includes two sets of spaced apart, radially extending flanges 42b. The flanges 42b provide a means of mounting the outer hub portion 45 on the center hub portion 42, while also transferring torque from the center hub portion 42 to the outer hub portion 45. Inboard portions of the hub plates 46, 48 are sandwiched between the flanges 42b on the central hub portion 42, and metal stiffener plates 56 which may be secured to the flanges 42b by fasteners (not shown). The stiffener plates 56 stiffen the connection between the center and outer hub portions 42, 45 respectively. As shown in FIG. 5, the center hub portion 42 includes a central counterbore 42a for receiving a drive shaft adapter 47 illustrated in FIGS. 6-8. The drive shaft adapter 47 may be connected to the center hub portion 42 by any suitable means, such as welding or bolted flanges, and functions to connect the center hub portion 42 to the drive interface 30 (FIG. 2) from the gearbox 32. In some embodiments, the drive shaft adapter 47 may be integrally formed with the center hub portion 42.

As seen in FIGS. 4 and 5, each of the propeller blades 26 includes blade body 26a having a root end provided with a generally tubular, internal blade root fitting 60 that includes a tapered outboard end 62. As will be discussed later in more detail, the fitting 60 along with tension straps 34 mount the root end of the blade body 26a on the center hub portions 42. The blade body 26a may be a composite that may be formed, as by laying up and curing composite materials over the outside surface of the fitting 60. The composite material forming the blade body 26a may be, for example and without limitation, a carbon fiber epoxy which is laid up over the fitting 60 either by hand or using automated material placement equipment (not shown).

Figure 11:
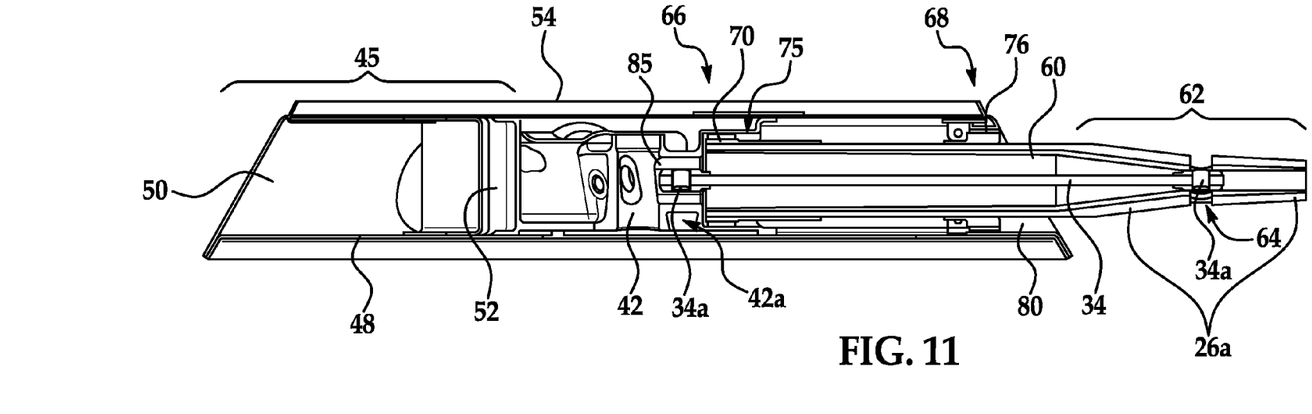
FIG. 11 is a cross sectional illustration through the hub assembly.
Figure 12:
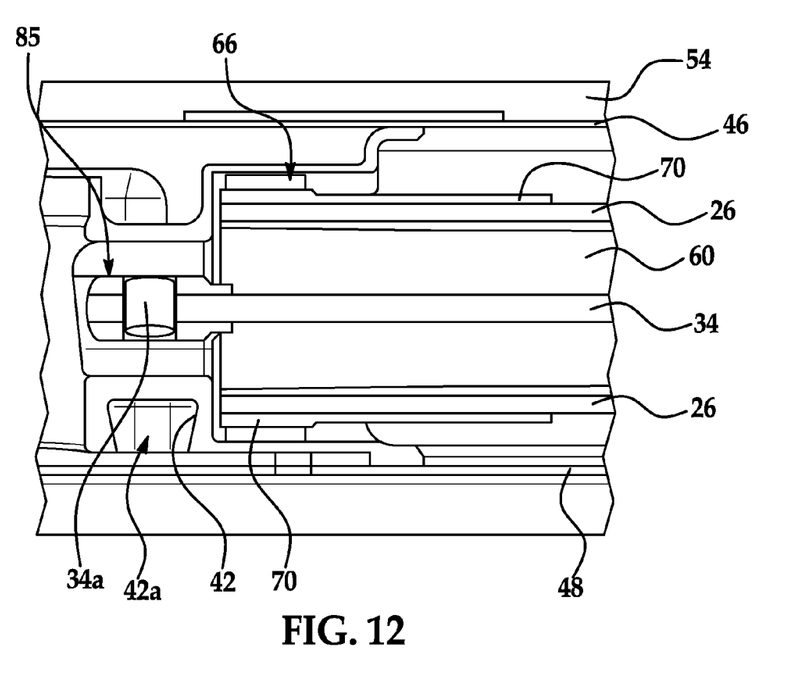
FIG. 12 is a sectional illustration showing additional details of the inboard bearing, blade fitting and tension strap.
Figure 13:
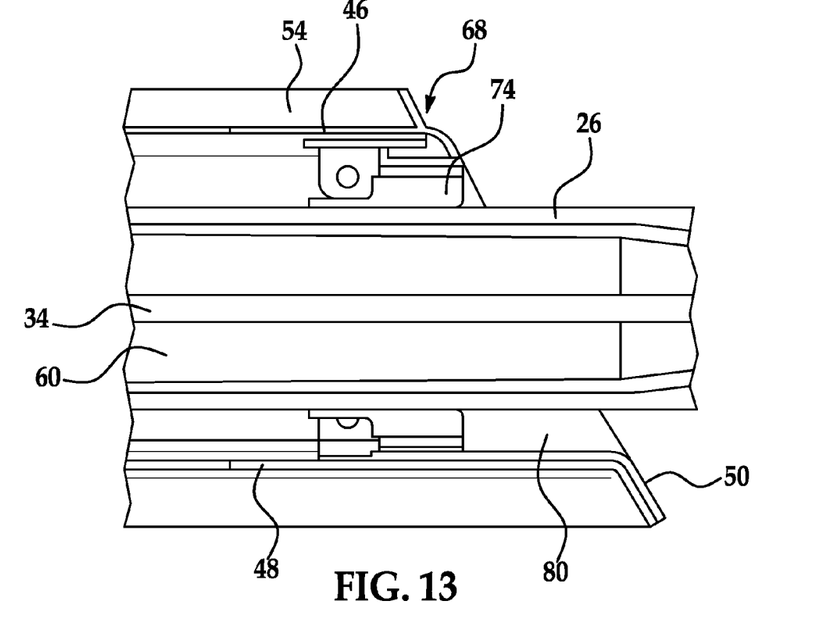
FIG. 13 is a sectional illustration showing additional details of the outboard bearing, blade fitting and tension strap.

Referring to FIG. 5, each of the blade fittings 60 is mounted for pitch rotation on the hub 28 by means of spaced apart inboard and outboard pitch rotation bearing assemblies 66. The bearing assemblies 66, 68 respectively include dry inboard and outboard bearings 70, 74 respectively bonded to the hub 28. As used herein, "dry" bearings refers to any of a wide variety of self-lubricating and "greaseless" bearings that do not employ wet lubricants such as grease that may increase in viscosity with decreasing temperature. Each of the bearings 70, 74 may comprise, for example and without limitation, a polytetrafluoroethylene (PTFE), also known as Teflon®. Depending upon the application, other dry, low friction materials may be used as the bearings 70, 74. Bearings 70, 74 respectively engage and bear against metallic cuffs 72, 76, which are sleeved over and fixed to blade body 26a, as best seen in FIG. 11

The inboard bearing 70 is generally cylindrical in shape and supports the root end of the blade 26 for rotation along a portion of its length inside the center hub portion 42. The outboard bearing 74 is also cylindrically shaped and supports an outboard portion of the root end of the blade 26 for rotation on the structural faring section 50. The pitch change bearings 70, 74 react the propeller blade moment loads while providing the rotational freedom required to vary the pitch of the blades 26.

The bearing 70 along with the root end of the blade 26 are nested within a counterbore 75 in the central hub portion 42, as best seen in FIGS. 5, 8, 9 and 11. Bearing 74 is held in a tubular metal bearing journal 80 which may be formed from a suitable metallic alloy. As seen in FIGS. 4, 5, 7 and 10, bearing journal 80 passes through circular openings 50a in the fairing 50 and may be bolted and bonded to the hub plates 46, 48, and to the ribs 52. The bolted interface area 85 between the bearing journal 80 and the hub plates 46, 48 provides an anchor point where weights (not shown) may be attached to balance the propeller 24. By placing the outer surface of the fore hub plate 46 directly on the outer mold line of the outer hub portion 45, the bearing couple is extended to its maximum length within the allotted envelope, thereby resulting in a minimal load and maximum endurance for the bearings 70, 74.

As previously mentioned, each of the blades 26 is connected to the center hub portion 42 by means of a flexible, torsionally compliant tension strap 34 coaxially disposed within each of the blade root fittings 60. The tension straps 34 react centrifugal force on the blade 26 generated by rotation of the propeller 24. The straps 34 may comprise, without limitation, multiple plies of a flexible composite material that allows the strap 34 to compliantly twist in torsion during blade pitch rotation. One end of each of the straps 34 is connected to the tapered portion 62 of the fitting 60 by means of a cylindrical retainer 34a and a pin 82 (FIG. 5) which passes through an opening 64 in the blade fitting 60. The opposite end of the strap 34 is secured to the center hub portion 42 by means of a second cylindrical retainer 34a and a pin 82 (FIG. 5) which are captured in a recess 85 (FIGS. 5, 11 and 12) formed within the center hub portion 42.

In operation, the inboard and outboard bearing assemblies 66, 68 respectively, allow pitch rotation of the blades 26 without the need for grease or similar wet lubrication that may become viscous at extreme low temperatures. The tension straps 34 react the centrifugal force generated by the spinning blades 26, yet allow rotation of the blades 26 during pitch adjustment. The light-weight outer hub portion 45 allows mounting of a portion of the blade 26 on the structural fairing section 50, thus reducing the overall weight of the hub assembly 28.

Although the embodiments of this disclosure have been described with respect to certain exemplary embodiments, it is to be understood that the specific embodiments are for purposes of illustration and not limitation, as other variations will occur to those of skill in the art.

What is claimed:

1. A hub for use with an aircraft comprising:
a first hub portion composed of a first material;
a second hub portion composed of a second material, the first material being different than the second material, the second hub portion forming an aperture to receive the first hub portion such that a first outer surface of the first hub portion and a first outer surface of the second hub portion are substantially flush and a second outer surface of the first hub portion and a second outer surface of the second hub portion are substantially flush;
a blade supported by the first and second hub portions and extending at least partially between the first hub portion and the second hub portion;
a first bearing assembly to support a first portion of the blade relative to the first hub portion; and
a second bearing assembly to support a second portion of the blade relative to the second hub portion.

2. The hub of claim 1, wherein the second hub portion surrounds the first hub portion.

3. The hub of claim 1, wherein the first material comprises metal and the second material comprises a composite material.

4. The hub of claim 1, wherein the first bearing assembly comprises a cylindrically shaped bearing supporting the first portion of the blade inside of the first hub portion, and wherein the bearing is self-lubricating.

5. The hub of claim 1, wherein the second bearing assembly comprises a cylindrically shaped bearing supporting the second portion of the blade inside the second hub portion, and wherein the bearing is self-lubricating.

6. The hub of claim 1, wherein the second hub portion comprises a hollow body.

7. A hub for use with an aircraft comprising:
a central hub;
an outer hub mounted on the central hub, a dimension along a longitudinal axis of the outer hub being substantially similar to a dimension along a longitudinal axis of the central hub;
a blade fitting coupled to the central hub and the outer hub, the blade fitting defining a body having a cavity, the blade fitting having a first portion coupled to the central hub and a second portion coupled to the outer hub; and
a flexible member disposed in the cavity of the blade fitting, the flexible member having a first end coupled to the central hub and a second end coupled to the body of the blade fitting.

8. The hub of claim 7, further comprising a bearing assembly coupled to the central hub, the bearing assembly positioned in an opening of the central hub and having an axis substantially perpendicular relative to a longitudinal axis of the central hub, the bearing assembly to receive the first portion of the blade fitting to support the blade fitting relative to the central hub.

9. The hub of claim 8, wherein the bearing assembly comprises a bearing positioned in a sleeve, the sleeve fixed to the opening of the central hub, wherein the bearing does not employ a wet lubricant.

10. The hub of claim 7, further comprising a bearing assembly coupled to the outer hub, the bearing assembly positioned in an opening of the outer hub and having an axis substantially perpendicular relative to a longitudinal axis of the outer hub, the bearing assembly to receive the second portion of the blade fitting to support the blade fitting relative to the outer hub.

11. The hub of claim 10, wherein the bearing assembly comprises a bearing positioned in a sleeve, the sleeve fixed to the opening of the outer hub, wherein the bearing does not employ a wet lubricant.

12. The hub of claim 7, wherein the flexible member comprises a torsion tension strap.

13. The hub of claim 7, wherein the first end of the flexible member is coupled to the central hub via a first pin and the second end of the flexible member is coupled to the outer hub via a second pin.

14. The hub of claim 7, wherein the central hub comprises a metallic material or alloy and the outer hub comprises a composite material.

15. A hub for use with an aircraft comprising:
a central hub portion composed of metal; and
an outer hub portion coupled to the central hub portion, the outer hub portion composed of a composite material, the outer hub portion including a first plate coupled to a second plate via an annular tapered body portion of the outer hub portion, the plates and the tapered body defining a cavity between the plates of the outer hub portion, the central hub portion being positioned between the first plate and the second plate, each of the first and second plates being directly attached to the central hub such that a longitudinal length of the central hub is contained within a dimensional envelope of the outer hub defined by the first and second plates.

16. The hub of claim 15, wherein the plates define a central opening of the outer hub portion to receive the central hub portion, wherein the outer hub portion surrounds the central hub portion.

17. The hub of claim 16, further comprising a rib coupled the first plate and the second plate, the rib positioned adjacent the central opening between respective inner surfaces of the plates.

18. The hub of claim 15, wherein the central hub portion is coupled to the outer hub portion via welding.

19. The hub of claim 15, wherein the central hub portion has a first flange adjacent an inner surface of the first plate and a second flange adjacent an inner surface of the second plate, the first and second plates are coupled to the hub via the respective first and second flanges, and wherein the first and second flanges transfer a torque from the central hub portion to the outer hub portion.

20. The hub of claim 19, wherein the first and second flanges are segmented flanges.

21. The hub of claim 15, wherein the central hub includes a first opening having a first axis substantially perpendicular to a longitudinal axis of the central hub to receive a first portion of a blade fitting and the outer hub includes a second opening having a second axis substantially aligned with the first opening to receive a second portion of the blade fitting.

22. The hub of claim 21, further comprising the blade fitting, the blade fitting having a torsion strap positioned inside the blade fitting such that a first end of the torsion strap is coupled to the blade fitting and a second end of the torsion strap is to couple to the central hub.

23. The hub of claim 15, wherein the central hub has a first radially extending flange on a first radially extending surface of the central hub and a second radially extending flange on a second radially extending surface opposite the first radially extending surface.

24. The hub of claim 23, wherein the outer hub has a first side and a second side opposite the first side, the first side being mounted on the central hub via the first radially extending flange and the second side being mounted on the central hub via the second radially extending flange such that a longitudinal length of the outer hub is substantially similar to a longitudinal length of the central hub.

* * * * *